2,759,791
Patented Aug. 21, 1956

2,759,791

PURIFICATION OF MATERIALS CONTAINING CHLORIDES

Louis Spiegler, Woodbury, N. J., assignor to the United States of America as represented by the United States Atomic Energy Commission No Drawing. Application January 30, 1945,
Serial No. 575,354

4 Claims. (Cl. 23—14.5)

This invention relates to the removal of chloride impurities from materials containing them. It is especially concerned with the separation of chlorine from alkaline materials such as uranium oxides and alkaline earth metal uranates.

Processes for working up uranium-containing residues sometimes result in the contamination of these residues with substantial quantities of one or more chlorides such as alkali-metal chlorides and alkaline earth metal chlorides. In working up residues containing fluorine by processes involving acidification, and vaporization of the resulting hydrogen fluoride, the chloride impurities react to form hydrogen chloride which volatilizes along with the hydrogen fluoride. Aside from contaminating the hydrogen fluoride product, hydrogen chloride exerts a serious corrosive action upon equipment.

An object of the invention is the removal of chloride impurities from materials containing them. A further object is the removal of such impurities without resorting to acidification and vaporization of hydrogen chloride. A further object is the selective removal of chlorine from materials containing chlorides and fluorides while retaining fluorides in the material. A further object of the invention is the removal of chlorine from calcium uranate residues containing inorganic chlorides and fluorides, such as alkali-metal and alkaline earth metal chlorides and fluorides.

In accordance with the invention material containing chloride impurities is heated with a substance having a salt-forming cation which forms a volatile salt of chlorine whereby the chlorine is eliminated in the form of vapor from the material.

Suitable compounds for accomplishing the purposes of the invention are ammonium salts other than ammonium chloride, for instance ammonium sulfate, and iron oxides or iron salts other than the chlorides. Ferric oxide has been found to be especially useful. If a ferrous salt is employed, it should be employed under oxidizing conditions.

The heating may be effected at any temperature above the boiling point or sublimation point of the salt formed by reaction of the salt-forming cation and chlorine. In application of the process to alkaline earth metal uranate residues temperatures between 600° C. and 1000° C. have been found to be especially effective when employing ammonium sulfate or iron oxide as the volatile-salt-forming reagent.

While the process is especially applicable to compositions of alkaline compounds of uranium and oxygen containing alkali-metal or alkaline earth metal chlorides, it may be used for the purification of other mixtures containing inorganic or organic chlorides and not deleteriously affected by the reaction conditions. Usually it is expedient to conduct the purification in an atmosphere of air. In case the chlorine is firmly bound in a non-volatile organic molecule, an oxidizing atmosphere assists in freeing it for reaction with the volatile-salt-forming reagent.

The following examples will serve to illustrate the invention. In the examples proportions are expressed in terms of weight unless otherwise indicated.

Example 1

An alkaline mixture of uranium oxide residues contained about 72% of uranium in tetravalent and more-than-tetravalent forms, 1.1% of chlorine, about ½% of fluorine, and small proportions of calcium, magnesium, and sodium, present as halides, oxides, and/or uranates. 100 parts of this mixture was mixed with 0.7 part of anhydrous ferric oxide, $Fe_2O_3$. The mixture was calcined in air at 800° C. After 1½ hours a sample was withdrawn and analyzed for chlorine. It now contained 0.7% of chlorine. The balance of the material was heated for 2 hours longer at the same temperature and then analyzed for chlorine. No chlorine was detected. The analytical method used (extraction and precipitation of chlorine as silver chloride) was capable of detecting quantities less than 0.1%. The fluorine content of the product was not altered by the presence of the iron oxide.

Example 2

An alkaline mixture of uranium oxide residues contained about 80% of combined uranium in tetravalent and more-than-tetravalent forms, 1.1% of chlorine and about ½% of fluorine, the balance being oxygen and minor proportions of sodium, calcium and magnesium. 100 parts of this mixture was mixed with 0.7 part of ferric oxide. This mixture was then heated in air at 800° C. as in the previous example. After 1½ hours the mixture contained 0.1% of chlorine. After 3½ hours no chlorine was detected in the product.

Example 3

A uranium residue contained about 40% of uranium, about 13% of fluorine and about 2.3% of chlorine, the balance being mainly calcium with a small proportion of sodium. 100 parts of this residue was mixed with 1 part of ferric oxide and the mixture was roasted for two hours at 800° C. After this heating period no chlorine was detected in the product.

Example 4

100 parts of the same mixture as employed in Example 3 was mixed with 6.2 parts of ammonium sulfate, $(NH_4)_2SO_4$, and roasted for two hours at 800° C. After this roasting period no chlorine was found in the product.

It will be understood that I intend to include variations and modifications of the invention and that the preceding examples are illustrations only and in no wise to be construed as limitations upon the invention, the scope of which is defined in the appended claims, wherein I claim:

1. The method for selectively removing chlorine from an alkaline uranium compound composition containing chlorides and fluorides of alkali metals and alkaline earth metals, which comprises mixing the composition with ammonium sulfate and heating the mixture so as to vaporize the ammonium chloride which is thereby formed.

2. The method of selectively removing chlorine from an alkaline uranium oxygen compound composition containing chlorides and fluorides of alkali metals and alkaline earth metals while retaining fluorides in said composition, which comprises mixing the composition with ammonium sulfate and heating the mixture at a temperature between 600° C. and 1000° C. to vaporize ammonium chloride.

3. The method of selectively removing chlorine from an alkaline uranium oxygen compound composition containing chlorides and fluorides selected from the group consisting of alkali-metal and alkaline earth metal chlorides and fluorides, which comprises mixing the composition with ammonium sulfate and heating the mixture in air at a temperature between 600° C. and 1000° C. to vaporize ammonium chloride.

4. The method of selectively removing chlorine from a uranium oxide residue which is contaminated with chlorides and fluorides of alkali metals and alkaline earth metals while retaining fluorides in said residue which comprises mixing said residue with ammonium sulfate and thereafter heating said mixture at a temperature between 600° C. and 1000° C. to expel the chlorine as ammonium chloride.

References Cited in the file of this patent

UNITED STATES PATENTS 1,634,870   Gerngross _____ July 5, 1927

OTHER REFERENCES

Mellor: "Inorganic and Theoretical Chemistry," vol. 13, page 817; Longmans, London; (1934).